United States Patent Office 3,642,775
Patented Feb. 15, 1972

3,642,775
10-OXO-10,11-DIHYDRO-DIBENZAZEPINE DERIVATIVE
Walter Schindler, Riehen, Switzerland, assignor to Ciba-Geigy Corporation, Ardsley, N.Y.
No Drawing. Filed Mar. 4, 1970, Ser. No. 16,552
Claims priority, application Switzerland, Mar. 10, 1969, 3,583/69
Int. Cl. C07d 41/08
U.S. Cl. 260—239 D          1 Claim

ABSTRACT OF THE DISCLOSURE

10 - oxo - 10,11-dihydro-5H-dibenz[b,f]azepine-5-carboxamide has a depressant effect on the central nervous system; the compound is the active ingredient of pharmaceutical compositions and is useful for the treatment of psychosomatic disturbances, of epilepsy and of trigeminal neuralgia.

---

The present invention relates to a new azepine derivative, to a process for the production thereof, to medicaments containing the new compound, and to the use thereof.

More particularly, the present invention relates to 10-oxo - 10,11 - dihydro - 5H - dibenz[b,f]azepine-5-carboxamide of Formula I,

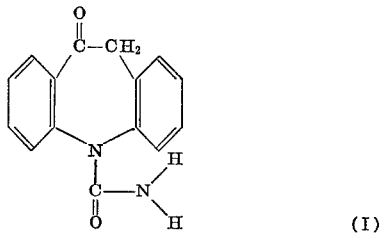

(I)

which has been found to possess valuable pharmacological properties and a particularly high therapeutic index. In the case of oral or rectal administration, the compound has a central nervous system depressant action, as can be shown, e.g. in the observation test.

Upon administration of about 1.5 to about 200 mg./kg., it exhibits anticonvulsive action, relaxes the central muscular system and inhibits the fighting reaction of mice. These properties, which are determined by selected standard tests [cp. R Domenjoz and W. Theobald, Ach. Int. Pharmacodyn. 120, 450 (1959) and W. Theobald et al., Arzneimittel-Forsch. 17, 561 (1967)], characterize the compound as being suitable for the treatment of psychosomatic disturbances, epilepsy, trigeminal neuralgia and cerebral spasticity.

The compound of Formula I is produced, according to the invention, by hydrolysing 10-methoxy-5H-dibenz[b,f]azepine-5-carboxamide of Formula II,

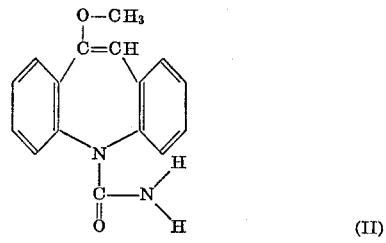

(II)

The hydrolysis is preferably carried out in a dilute mineral acid, e.g. in dilute hydrochloric or sulphuric acid. It can, however, also be performed in a mixture of water and a water-miscible solvent, e.g. methanol, ethanol or dioxane, in the presence of an acid ion exchanger in its acidic form. Such ion exchanges are, e.g. Amberlit® IR–100 (trademark of Rohm & Haas) or Dowex® (trademark of Dow Chemicals).

The starting material 10-methoxy-5H-dibenz[b,f]azepine-5-carboxamide, is produced, for example, as follows: 10-methoxy-5H-dibenz[b,f]azepine (J. R. Geigy A.G., Belgian Pat. No. 597,793) is reacted with phosgene in toluene to give the 10-methoxy-5H-dibenz[b,f]azepine-5-carbonyl chloride, which is converted in ethanol with ammonia into the amide.

As mentioned above, the new active substance is administered orally or rectally. The dosage depends on the manner of administration, the species, the age and on the individual condition. In general, the daily dosage of the active substance varies between about 3 mg./kg. and about 20 mg./kg. for warm-blooded animals. Suitable dosage units such as dragées, tablets or suppositories, preferably contain 30–200 mg. of an active substance according to the invention.

Dosage units for oral administration preferably contain, as active substance, between 10 and 90% of the compound of Formula I. They are produced by combining the active substance with, e.g. solid pulverulent carriers such as lactose, saccharose, sorbital, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The dragée cores are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration are hard gelatine capsules as well as soft closed capsules made from gelatine and a softener, such as glycerin. The hard capsules preferably contain the active substance as a granulate, e.g. in admixture with fillers such as maize starch, and/or lubricants such as talcum or magnesium stearate and, optionally, stabilisers such as sodium metabisulphite $(Na_2S_2O_5)$ or ascorbic acid. In soft capsules, the active substance is preferably dissolved or suspended in suitable liquids such as liquid polyethylene glycol, whereby stabilisers can also be added.

Suitable dosage units for rectal administration are, e.g. suppositories consisting of a combination of an active substance with a suppository foundation substance. Suitable as a suppository foundation subtance are, e.g. natural or synthetic triglycerides, paraffin hydrocarbons, polyethylene glycols or higher alkanols. Also suitable are gelatine rectal capsules consisting of a combination of the active substance and a foundation substance. Suitable as a foundation substance are, e.g. liquid triglycerides, polyethylene glycols or paraffin hydrocarbons.

The following example will serve to further illustrate the production of the new compounds of Formula I. The temperatures are given in degrees centigrade.

EXAMPLE 1

(a) 65 g. of 10-methoxy-5H-dibenz[b,f]azepine-5-carboxamide are refluxed with 650 ml. of 2 N-hydrochloric acid for 2 hours. After cooling, the reaction product is filtered with suction. After recrystallization from ethanol, the 10 - oxo - 10,11-dihydro-5H-dibenz[b,f]azepine-5-carboxamide is obtained, M.P. 215–216°; yield 49 g. 80% of the theoretical value.

The starting compound, the 10-methoxy-5H-dibenz[b,f]azepine-5-carboxamide, is produced as follows:

(b) 223 g. of 10-methoxy-5H-dibenz[b,f]azepine (cp. J. R. Geigy A. G., Belgian Pat. No. 597,793) in 1.500 ml. of abs. toluene are heated, whilst stirring is performed, to 30°. A vigorous stream of phosgene is then introduced into the reaction mixture. The internal temperature is raised in the course of 3 hours to 95° and the reaction mixture is then held for one hour at this temperature. The supply of phosgene is then discontinued, the source of heat removed and the excess of phosgene blown out with dry nitrogen. The precipitated reaction product is subsequently filtered with suction. The filtrate is concentrated by evaporation under a water-jet vacuum and the residue crystallized from ethanol. A further amount of the reaction product is obtained which, together with the first fraction, is recrystallized from ethanol, whereupon the 10-methoxy-5H-dibenz[b,f]azepine-5-carbonyl chloride melts at 138°; yield 221 g., 77% of the theoretical value.

(c) 215 g. of the carbonyl chloride, produced according to (b), are refluxed in 2.000 ml. of ethanol. Dry ammonia is introduced into the boiling solution, whilst this is being stirred, for 4 hours. The reaction mixture is afterwards cooled to room temperature and poured into 5.000 ml. of water. The precipitated crystals are filtered with suction and washed with water. The moist crude product is recrystallized from ethanol, whereupon the 10 - methoxy - 5H - dibenz[b,f]azepine-5-carboxamide is obtained, M.P. 181°; yield 148 g., 73% of the theoretical value.

The following prescriptions further illustrate the production of tablets, dragées, capsules and suppositories:

EXAMPLE 2

500.0 g. of 10-oxo-10,11-dihydro-5H-dibenz[b,f]azepine-5-carboxamide are mixed with 550.0 g. of lactose and 292.0 g. of potato starch. The mixture is moistened with an alcoholic solution of 8.0 g. of gelatine, granulated through a sieve and dried. 60.0 g. of potato starch, 60.0 g. of talcum, 10.0 g. of magnesium stearate and 20.0 g. of highly dispersed silicon dioxide are mixed in, and the mixture pressed into 10,000 tablets each weighing 150 mg. and each containing 50 mg. of active substance. Optionally, the tablets can be provided with grooves for finer adjustment of the dosage amount.

EXAMPLE 3

A granulate is produced from 1.000 g. of 10-oxo-10,11-dihydro-5H-dibenz[b,f]azepine-5-carboxamide, 379.0 g. of lactose and the aqueous solution of 6.0 g. of gelatine. After being dried, the granulate is mixed with 10.0 g. of colloidal silicon dioxide, 40.0 g. of talcum, 60.0 g. of potato starch and 5.0 g. of magnesium stearate, and the mixture is pressed into 10,000 dragée cores. These are afterwards coated with a concentrated syrup made from 533.5 g. of crystallized saccharose, 20.0 g. of shellac, 75.0 g. of gum arabic, 250.0 g. of talcum, 20.0 g. of colloidal silicon dioxide and 1.5 g. of dyestuff, and then dried. Dragées, each weighing 240 mg. and each containing 100 mg. of active substance, are being obtained.

EXAMPLE 4

To produce 1.000 capsules, each containing 75 mg. of active substance, 75.0 g. of 10-oxo-10,11-dihydro-5H-dibenz[b,f]azepine-5-carboxamide, are mixed with 198.0 g. of lactose. The mixture is evenly moistened with an aqueous solution of 2.0 g. of gelatine and is then granulated through a suitable sieve (e.g. Sieve III according to Ph. Helv. V). The granulate is mixed with 10.0 g. of dried maize starch and 15.0 g. of talcum, and the mixture is uniformly filled into 1.000 hard gelatine capsules, size 1.

EXAMPLE 5

A suppository foundation mixture is prepared from 10.0 g. of 10-oxo-10,11-dihydro-5H-dibenz[b,f]azepine-5-carboxamide and 158.5 g. of adeps solidus, and from this mixture are filled 100 suppositories, each containing 100 mg. of active substance.

What is claimed is:

1. 10 - oxo - 10,11 - dihydro-5H-dibenz[b,f]azepine-5-carboxamide.

References Cited

FOREIGN PATENTS 403,767   6/1966   Switzerland _____ 260—239

ALTON D. ROLLINS, Primary Examiner

U.S. Cl. X.R.

424—244